(12) United States Patent
Irie et al.

(10) Patent No.: US 10,348,973 B2
(45) Date of Patent: Jul. 9, 2019

(54) IMAGING DEVICE HAVING PAN/TILT CONTROL FOR OBJECT TRACKING, IMAGING METHOD, AND COMPUTER-READABLE MEDIUM

(71) Applicant: FUJIFILM Corporation, Tokyo (JP)

(72) Inventors: Fuminori Irie, Saitama (JP); Masaya Tamaru, Saitama (JP); Mikio Watanabe, Saitama (JP); Takeshi Misawa, Saitama (JP); Daisuke Hayashi, Saitama (JP); Hiroyuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/433,103

(22) Filed: Feb. 15, 2017

(65) Prior Publication Data

US 2017/0163899 A1 Jun. 8, 2017

Related U.S. Application Data

(63) Continuation of application No. PCT/JP2015/068042, filed on Jun. 23, 2015.

(30) Foreign Application Priority Data

Sep. 10, 2014 (JP) ................... 2014-184166

(51) Int. Cl.
*H04N 5/225* (2006.01)
*H04N 5/232* (2006.01)
(Continued)

(52) U.S. Cl.
CPC ......... *H04N 5/23296* (2013.01); *G03B 15/00* (2013.01); *G06K 9/00744* (2013.01);
(Continued)

(58) Field of Classification Search
CPC .................................................. H04N 5/23296
(Continued)

(56) References Cited

U.S. PATENT DOCUMENTS

| 8,842,980 B2 | 9/2014 | Imanishi |
| 2005/0063566 A1* | 3/2005 | Beek ................... A61B 5/0059 382/115 |

(Continued)

FOREIGN PATENT DOCUMENTS

| CN | 1568489 A | 1/2005 |
| CN | 101014110 A | 8/2007 |

(Continued)

OTHER PUBLICATIONS

English Translation of the International Preliminary Report on Patentability and Written Opinion dated Mar. 14, 2017 in PCT/JP2015/068042.

(Continued)

*Primary Examiner* — Usman A Khan
(74) *Attorney, Agent, or Firm* — Birch, Stewart, Kolasch & Birch, LLP

(57) ABSTRACT

An imaging device (pan/tilt camera) includes an imaging unit including an imaging lens and an imaging element, a pan/tilt mechanism that rotates the imaging unit in the horizontal direction and the vertical direction with respect to a camera body, an object detection unit that detects an object, which is a tracking target, from a moving image captured by the imaging unit, a pan/tilt control unit that controls the pan/tilt mechanism such that the object detected by the object detection unit is tracked, a motion sensor that detects a physical amount related to the movement of the camera body, and an operation control unit that stops the (Continued)

pan/tilt mechanism in a case in which the physical amount detected by the motion sensor is equal to or greater than a first threshold value.

13 Claims, 12 Drawing Sheets

(51) Int. Cl.
    *G03B 15/00*    (2006.01)
    *H04N 7/18*    (2006.01)
    *G06T 7/246*    (2017.01)
    *G06K 9/00*    (2006.01)
    *H04N 5/77*    (2006.01)
    *G03B 37/02*    (2006.01)

(52) U.S. Cl.
    CPC .............. *G06T 7/246* (2017.01); *G06T 7/248* (2017.01); *H04N 5/2328* (2013.01); *H04N 5/23206* (2013.01); *H04N 5/23219* (2013.01); *H04N 5/23261* (2013.01); *H04N 5/77* (2013.01); *H04N 5/772* (2013.01); *H04N 7/18* (2013.01); *H04N 7/183* (2013.01); *G03B 37/02* (2013.01); *G03B 2206/00* (2013.01); *G06T 2207/10016* (2013.01); *G06T 2207/30201* (2013.01); *G06T 2207/30232* (2013.01); *G06T 2207/30241* (2013.01)

(58) Field of Classification Search
    USPC .................................................... 348/207.11
    See application file for complete search history.

(56) References Cited

U.S. PATENT DOCUMENTS

| | | | |
|---|---|---|---|
| 2006/0176373 A1* | 8/2006 | Ito | G02B 27/646 348/208.12 |
| 2007/0177859 A1 | 8/2007 | Ito | |
| 2009/0073304 A1* | 3/2009 | Kumagai | G03B 13/30 348/345 |
| 2011/0158620 A1 | 6/2011 | Kanayama et al. | |
| 2014/0267805 A1* | 9/2014 | Webb | H04N 5/2328 348/208.2 |

FOREIGN PATENT DOCUMENTS

| | | |
|---|---|---|
| JP | 2007-36661 A | 2/2007 |
| JP | 2007-171278 A | 7/2007 |
| JP | 2009-38515 A | 2/2009 |
| JP | 2011-138028 A | 7/2011 |
| JP | 2013-93681 A | 5/2013 |
| WO | WO 2013/021728 A1 | 2/2013 |

OTHER PUBLICATIONS

International Search Report, issued in PCT/JP2015/068042, dated Sep. 1, 2015.
Written Opinion of the International Searching Authority, issued in PCT/JP2015/068042, dated Sep. 1, 2015.
Chinese Office Action and Search Report, dated Dec. 24, 2018, for Chinese Application No. 201580048766.X, with English translations.

* cited by examiner

IMAGING DEVICE HAVING PAN/TILT CONTROL FOR OBJECT TRACKING, IMAGING METHOD, AND COMPUTER-READABLE MEDIUM

CROSS-REFERENCE TO RELATED APPLICATIONS

This application is a Continuation of PCT International Application No. PCT/JP2015/068042 filed on Jun. 23, 2015, which claims priority under 35 U.S.C. § 119(a) to Japanese Patent Application No. 2014-184166 filed on Sep. 10, 2014. Each of the above applications is hereby expressly incorporated by reference, in their entirety, into the present application.

BACKGROUND OF THE INVENTION

1. Field of the Invention

The present invention relates to an imaging device (pan/tilt camera), an imaging method, and a program, and more particularly, to an imaging device (pan/tilt camera) having an automatic object tracking function, an imaging method using a pan/tilt camera, and a program.

2. Description of the Related Art

An imaging device (pan/tilt camera) provided with a pan/tilt mechanism can operate the pan/tilt mechanism to capture images in a wide range even in a case in which it is installed at a fixed point. Therefore, the pan/tilt camera is generally used to capture an image of a moving object.

A pan/tilt camera having an automatic object tracking function has been known. Here, the automatic object tracking function is a function that detects and tracks a specific object in a captured image.

In the related art, a technique has been considered which, in a case in which various failures occur in a pan/tilt camera, informs a user of the failures and responds to the failures.

For example, JP2007-36661A discloses a technique which displays a warning indicating the occurrence of a failure in a cooling device of a pan/tilt camera, using a tally lamp that is provided in a camera head portion operated in a pan direction and a tilt direction.

JP2013-93681A discloses a technique which detects a communication failure in a monitoring camera and controls the transmission of a camera image.

In addition, a technique has been considered which is related to vibration detected by a vibration sensor and vibration caused by the operation of a pan/tilt mechanism in a pan/tilt camera provided with the vibration sensor.

For example, JP2011-138028A discloses a technique in which a vibration sensor of a pan/tilt camera does not detect vibration caused by the operation of a pan/tilt mechanism.

SUMMARY OF THE INVENTION

In some cases, when the position or direction of a pan/tilt camera body is changed by external force (for example, is moved by the hand of a person) while a pan/tilt camera is automatically tracking an object, the pan/tilt camera misses the object, which makes it difficult to normally track the object. In addition, when the position or direction of the pan/tilt camera body is changed by external force, the pan/tilt camera misses the object to be tracked. As a result, a failure, such as hunting in which the pan/tilt camera repeatedly performs a pan operation and a tilt operation in order to search for the object, occurs or the problem that a finger is caught by the pan operation or the tilt operation arises.

However, JP2007-36661A to JP2011-138028A do not disclose a warning process or measures against a case in which a failure occurs in the automatic object tracking function of the pan/tilt camera.

The invention has been made in view of the above-mentioned problems and an object of the invention is to provide an imaging device (pan/tilt camera), an imaging method, and a program that can prevent an abnormal operation, such as hunting caused by abnormal automatic object tracking.

According to an aspect of the invention, there is provided an imaging device (pan/tilt camera) comprising: an imaging unit that includes an imaging lens and an imaging element; a pan/tilt mechanism that rotates the imaging unit in a horizontal direction and a vertical direction with respect to a camera body; an object detection unit that detects an object, which is a tracking target, from a moving image captured by the imaging unit; a pan/tilt control unit that controls the pan/tilt mechanism such that the object detected by the object detection unit is tracked; a motion sensor that detects a physical amount related to the movement of the camera body; and an operation control unit that stops the pan/tilt mechanism in a case in which the physical amount detected by the motion sensor is equal to or greater than a first threshold value.

According to this aspect, the pan/tilt mechanism is stopped according to the physical amount related to the movement of the pan/tilt camera which is detected by the motion sensor. Therefore, it is possible to prevent an abnormal operation such as hunting caused by abnormal automatic object tracking.

Preferably, the operation control unit directs the pan/tilt control unit to resume the control of the pan/tilt mechanism in a case in which the physical amount detected by the motion sensor is less than a first resumption threshold value that is less than the first threshold value.

According to this aspect, in a case in which the detected physical amount is less than the first resumption threshold value, the operation of the pan/tilt mechanism is resumed. Therefore, the operation of the pan/tilt mechanism can be resumed to track the object.

Preferably, the first threshold value includes a first horizontal direction threshold value which is related to the movement of the camera body in the horizontal direction and a first vertical direction threshold value which is related to the movement of the camera body in the vertical direction and is different from the first horizontal direction threshold value. Preferably, the physical amount detected by the motion sensor includes physical amounts related to the movement of the camera body in the horizontal direction and the vertical direction. Preferably, the operation control unit stops the operation of the pan/tilt mechanism through the pan/tilt control unit in a case in which the physical amount in the horizontal direction which is detected by the motion sensor is equal to or greater than the first horizontal direction threshold value or in a case in which the physical amount in the vertical direction which is detected by the motion sensor is equal to or greater than the first vertical direction threshold value.

According to this aspect, the operation of a pan mechanism and a tilt mechanism is controlled by the threshold values which are different in the horizontal direction of the camera body and the vertical direction of the camera body. Therefore, it is possible to accurately control the operation of the pan/tilt mechanism according to the movement of the position of the pan/tilt camera.

Preferably, the pan/tilt camera further comprises a recording unit in which the moving image captured by the imaging unit is recorded. Preferably, the operation control unit stops the recording of the moving image in the recording unit in a case in which the physical amount detected by the motion sensor is equal to or greater than a second threshold value that is greater than the first threshold value.

According to this aspect, in a case in which the physical amount detected by the motion sensor is equal to or greater than the second threshold value, the recording operation for the recording unit is stopped. Therefore, a high-quality moving image (image) captured by the pan/tilt camera of which abnormal operation has been prevented is recorded.

Preferably, the operation control unit resumes the recording operation for the recording unit in a case in which the physical amount detected by the motion sensor is less than a second resumption threshold value that is less than the second threshold value.

According to this aspect, in a case in which the physical amount detected by the motion sensor is less than the second resumption threshold value, the recording operation for the recording unit is resumed. Therefore, the recording of the image in the recording unit is resumed.

Preferably, the operation control unit changes an operation mode to a power saving mode in which the capture of the moving image by the imaging unit is stopped in a case in which the physical amount detected by the motion sensor is equal to or greater than a third threshold value that is greater than the first threshold value.

According to this aspect, in a case in which the physical amount detected by the motion sensor is equal to or greater than the third threshold value, the operation mode is changed to the power saving mode in which the capture of the moving image by the imaging unit is stopped. Therefore, it is possible to reduce power consumption under an environment that is not suitable for a moving image capture operation in which the physical amount related to movement is large.

Preferably, the operation control unit cancels the power saving mode and resumes the capture of the moving image by the imaging unit in a case in which the physical amount detected by the motion sensor is less than a third resumption threshold value that is less than the third threshold value.

According to this aspect, in a case in which the physical amount detected by the motion sensor is less than a third resumption threshold value, the power saving mode is cancelled and the capture of the moving image by the imaging unit is resumed. Therefore, the capture of the moving image by the imaging unit is resumed under an environment that is suitable for capturing a moving image.

Preferably, the operation control unit turns off the pan/tilt camera in a case in which a state in which the physical amount detected by the motion sensor is equal to or greater than the second threshold value is maintained for a predetermined period of time.

According to this aspect, the pan/tilt camera is turned off in a case in which the state in which the detected physical amount is equal to or greater than the second threshold value is maintained for a predetermined period of time. Therefore, it is possible to prevent the pan/tilt camera from being turned on even in a state in which the captured moving image is not recorded and thus to prevent unnecessary power consumption.

Preferably, the operation control unit turns off the pan/tilt camera in a case in which a state in which the physical amount detected by the motion sensor is equal to or greater than the third threshold value is maintained for a predetermined period of time.

According to this aspect, the pan/tilt camera is turned off in a case in which the state in which the detected physical amount is equal to or greater than the third threshold value is maintained for a predetermined period of time. Therefore, it is possible to prevent the pan/tilt camera from being turned on even in a state in which a moving image is not captured and thus to prevent unnecessary power consumption.

Preferably, in a case in which the pan/tilt mechanism is controlled so as to track the object, the object detection unit detects the object, which is the tracking target, from an image in a first region of the moving image captured by the imaging unit. Preferably, in a case in which the control of the pan/tilt mechanism by the pan/tilt control unit is resumed, the object detection unit detects the object, which is the tracking target, from an image in a second region that is larger than the first region in the moving image captured by the imaging unit.

According to this aspect, in a case in which the pan/tilt mechanism is controlled so as to track the object, the object is detected from the first region. In a case in which the control of the pan/tilt mechanism by the pan/tilt control unit is resumed, the object is detected from the second region larger than the first region. Therefore, according to this aspect, in a case in which the control of the pan/tilt mechanism is resumed, the possibility that a desired object will be detected increases.

According to another aspect of the invention, there is provided an imaging method of an imaging device comprising an imaging unit that includes an imaging lens and an imaging element and a pan/tilt mechanism that rotates the imaging unit in a horizontal direction and a vertical direction with respect to a camera body. The method comprises: an object detection step of detecting an object, which is a tracking target, from a moving image captured by the imaging unit; a pan/tilt control step of controlling the pan/tilt mechanism such that the object detected in the object detection step is tracked; a movement detection step of detecting a physical amount related to the movement of the camera body; and an operation control step of stopping the pan/tilt mechanism in a case in which the physical amount detected in the movement detection step is equal to or greater than a first threshold value.

According to still another aspect of the invention, there is provided a program that causes a computer to perform an imaging method of an imaging device comprising an imaging unit that includes an imaging lens and an imaging element and a pan/tilt mechanism that rotates the imaging unit in a horizontal direction and a vertical direction with respect to a camera body. The imaging method includes: an object detection step of detecting an object, which is a tracking target, from a moving image captured by the imaging unit; a pan/tilt control step of controlling the pan/tilt mechanism such that the object detected in the object detection step is tracked; a movement detection step of detecting a physical amount related to the movement of the camera body; and an operation control step of stopping the pan/tilt mechanism in a case in which the physical amount detected in the movement detection step is equal to or greater than a first threshold value.

According to the invention, in a case in which the physical amount detected by the motion sensor is equal to or greater than the first threshold value, the pan/tilt mechanism is stopped. Therefore, it is possible to provide an imaging device (pan/tilt camera), an imaging method, and a program that can prevent an abnormal operation such as hunting caused by abnormal automatic object tracking which is caused by the movement of the pan/tilt camera.

DESCRIPTION OF THE PREFERRED EMBODIMENTS

Hereinafter, embodiments of an imaging device (pan/tilt camera), an imaging method, and a program according to the invention will be described with reference to the accompanying drawings.

(Outward Appearance of Imaging Device)

Figure 1:
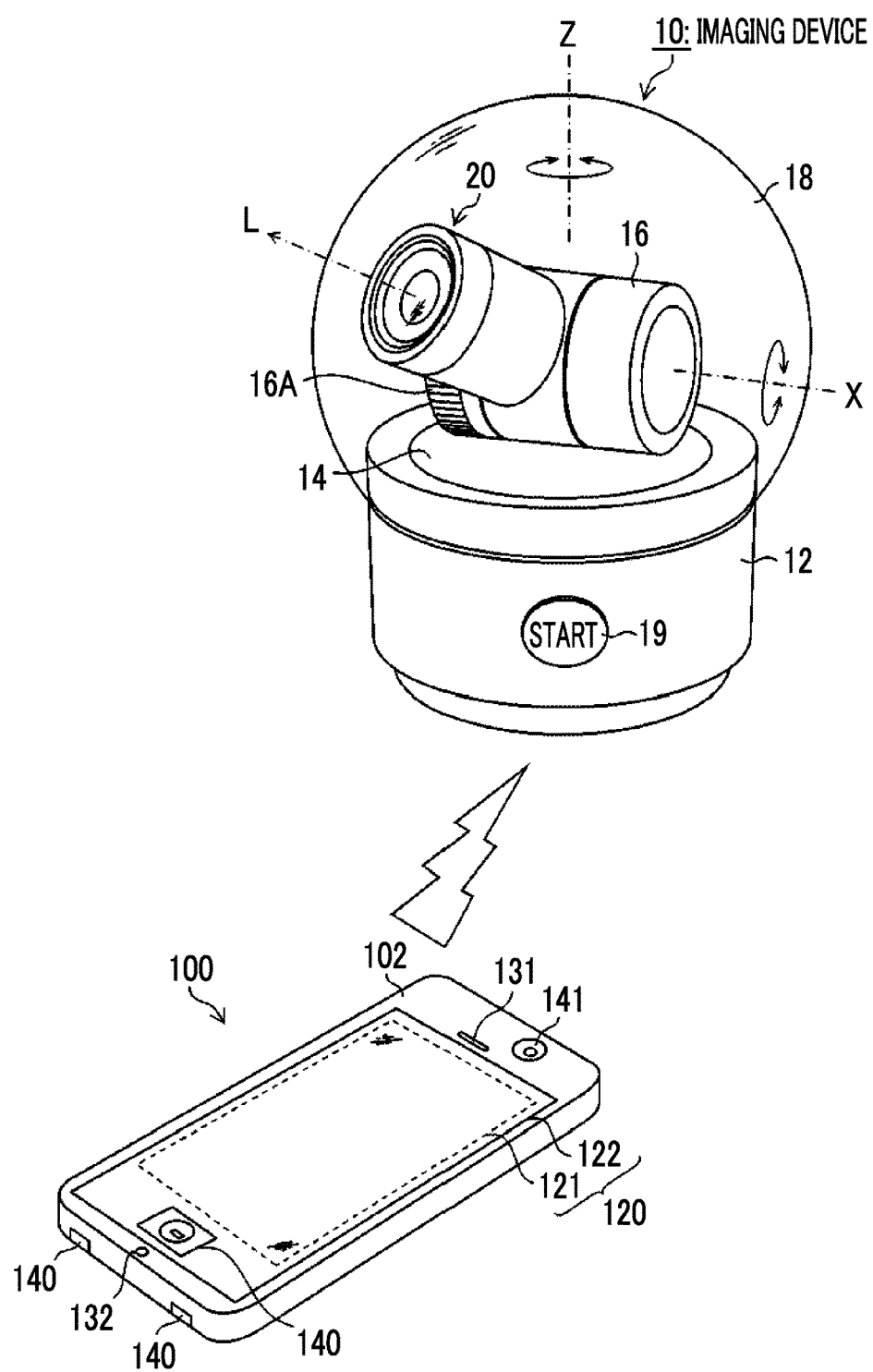
FIG. 1 is a perspective view illustrating the outward appearance of a pan/tilt operation device and an imaging device.

FIG. 1 is a perspective view illustrating the outward appearance of a pan/tilt operation device 100 and an imaging device 10 according to the invention. Here, the pan/tilt operation device (smart phone) 100 is used to operate the imaging device (pan/tilt camera) 10. FIG. 1 illustrates an example in which the pan/tilt operation device 100 operates the pan/tilt camera 10 remotely (through wireless communication). However, the invention is not limited thereto. The pan/tilt operation device 100 may be connected to the pan/tilt camera 10 in a wired manner or may be integrated with the pan/tilt camera 10.

The pan/tilt camera 10 mainly includes a device body 12, a base 14, a holding portion 16 which is fixed to the base 14 and holds an imaging unit 20 so as to be rotatable, and a dome cover 18 which covers the imaging unit 20.

Figure 3:
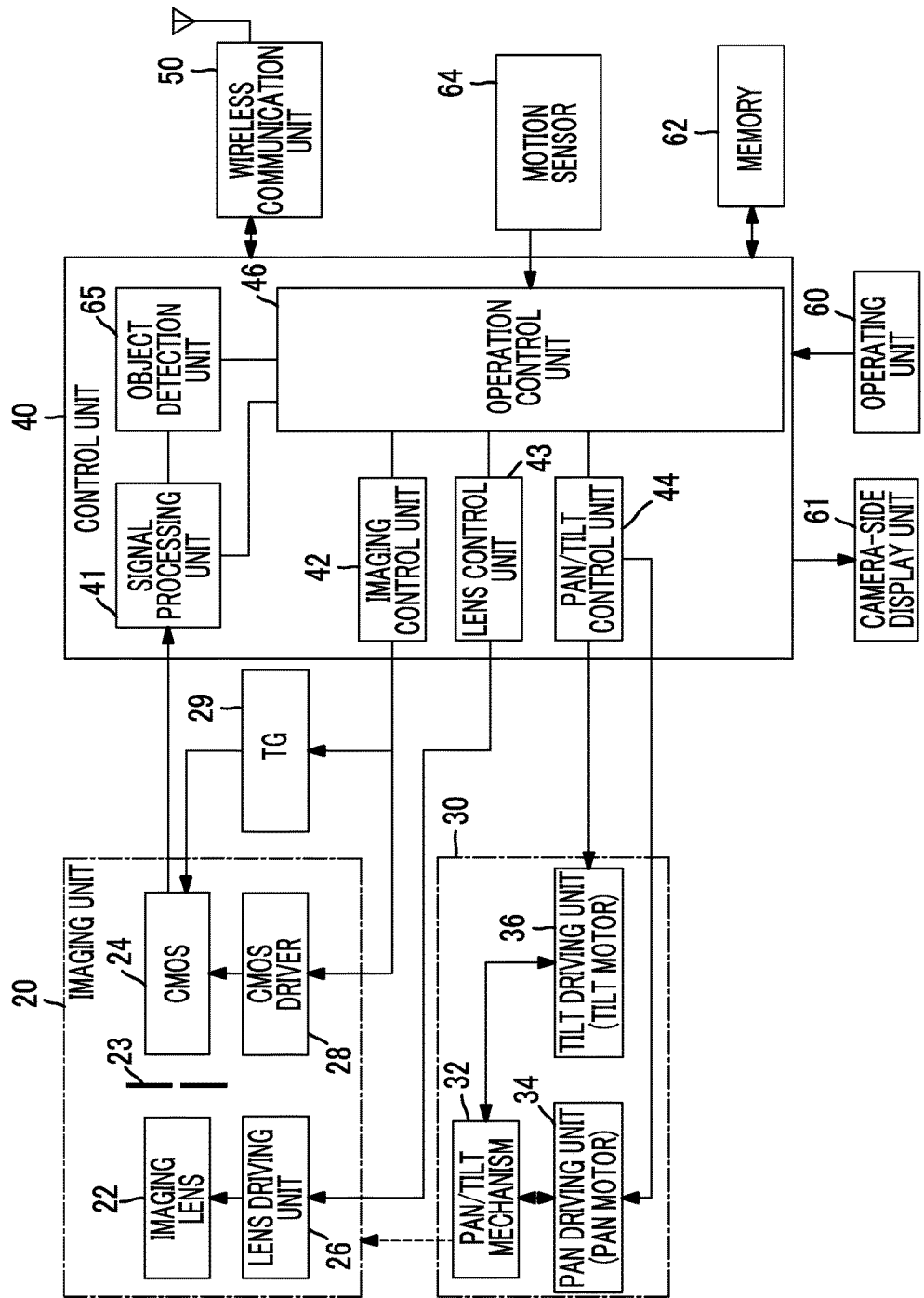
FIG. 3 is a block diagram illustrating an example of the internal structure of the pan/tilt camera.

The base 14 is provided so as to be rotatable on the axis of the vertical direction Z of the device body 12 and is rotated on the axis of the vertical direction Z by a pan driving unit 34 (FIG. 3).

The holding portion 16 includes a gear 16A that is provided on the same axis as the horizontal direction X. Driving force is transmitted from a tilt driving unit 36 (FIG. 3) through the gear 16A to rotate (tilt) the imaging unit 20 in the vertical direction.

The dome cover 18 is a dustproof and drip-proof cover and preferably has a domic shape which has a predetermined thickness and has, as a center of curvature, an intersection point between the axis of the horizontal direction X and the axis of the vertical direction Z such that the optical performance of the imaging unit 20 does not change, regardless of an optical axis direction L of the imaging unit 20.

It is preferable to provide a tripod attachment portion (for example, tripod screws) (not illustrated) on the rear surface of the device body 12.

The pan/tilt camera 10 is provided with an imaging start button 19 that instructs to start imaging and a power switch (not illustrated). The pan/tilt camera 10 includes a wireless communication unit 50 (FIG. 3) and mainly receives various types of operation instructions from an external terminal (a smart phone 100 in this example) using wireless communication with the smart phone 100.

Figure 2:
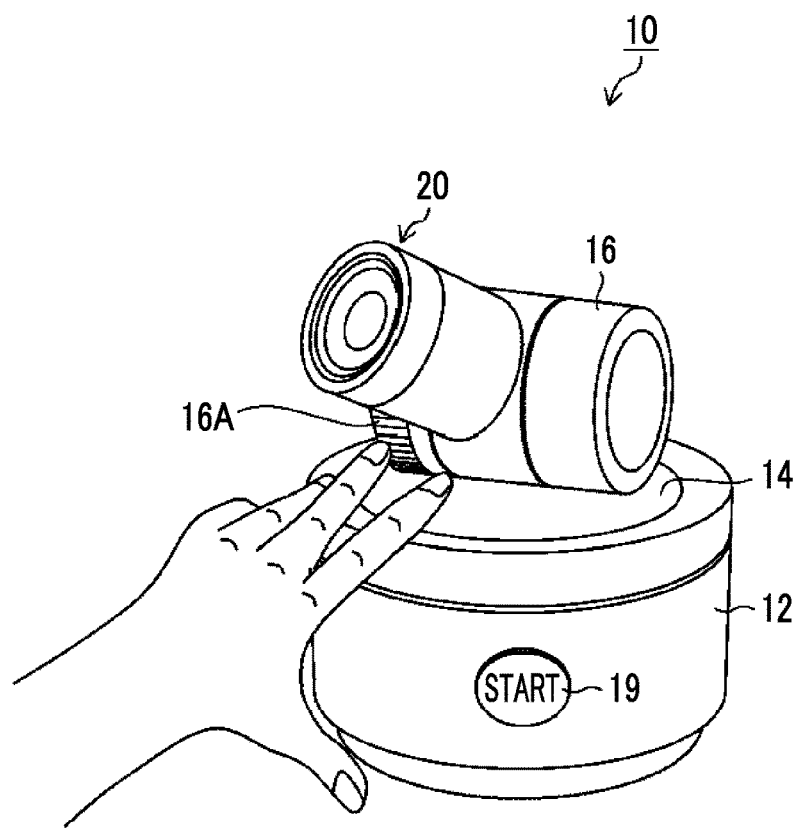
FIG. 2 is a conceptual diagram illustrating the movement of a pan/tilt camera by external force.

FIG. 2 is a conceptual diagram illustrating the movement of the pan/tilt camera (which is also referred to as a pan/tilt camera body) 10 by external force. In the case illustrated in FIG. 2, the pan/tilt camera 10 is moved by the hand of a person as external force. In a case in which the pan/tilt camera 10 automatically tracks an object, when the pan/tilt camera 10 is moved by external force, correct object tracking is not performed and an abnormal operation is likely to occur. That is, when the pan/tilt camera 10 is moved by external force during object tracking, the object is missed or defocusing occurs. As a result, in some cases, the object is not correctly tracked and the pan/tilt camera is abnormally operated.

(Internal Structure of Imaging Device)

FIG. 3 is a block diagram illustrating an example of the internal structure of the pan/tilt camera 10.

The pan/tilt camera 10 can capture both still images and moving images and mainly comprises the imaging unit 20, a pan/tilt device 30, a control unit 40, a camera-side display unit 61, an operating unit 60, a memory 62, a motion sensor 64, and the wireless communication unit 50.

The imaging unit 20 includes, for example, an imaging lens 22 and an imaging element 24. The imaging lens 22 is a prime lens or a zoom lens and focuses an object image on an imaging surface of the imaging element 24. A focus lens, a variable magnification lens (in the case of a zoom lens), and a diaphragm 23 included in the imaging lens 22 are driven by a lens driving unit 26.

In this example, the imaging element 24 is a color imaging element in which color filters of three primary colors, that is, red (R), green (G), and blue (B) are arranged in a predetermined pattern (a Bayer array, a G stripe R/G full-checkered pattern, an X-Trans (registered trademark) array, or a honeycomb array) for each pixel and is a complementary metal oxide semiconductor (CMOS) image sensor. However, the imaging element 24 is not limited to the CMOS image sensor and may be a charge coupled device (CCD) image sensor.

The imaging element 24 is driven by a CMOS driver 28 including, for example, a vertical driver and a horizontal driver and a timing generator (TG) 29. A pixel signal corresponding to the amount of incident object light (a digital signal corresponding to signal charge accumulated in each pixel) is read from the imaging element 24.

The pan/tilt device 30 comprises, for example, a pan/tilt mechanism 32, the pan driving unit 34, and the tilt driving unit 36. As illustrated in FIG. 1, the pan/tilt mechanism 32 includes a pan mechanism that rotates the imaging unit 20 in the horizontal direction (pan direction) with respect to the device body 12 and a tilt mechanism 32 that rotates the imaging unit 20 in the vertical direction (tilt direction) with respect to the device body 12. The pan/tilt mechanism 32 includes a home position sensor that detects the standard position of a rotation angle (pan angle) in the pan direction and a home position sensor that detects the standard position of an inclination angle (tilt angle) in the tilt direction.

The pan driving unit 34 and the tilt driving unit 36 each include a stepping motor and a motor driver and output driving force to the pan/tilt mechanism 32 to drive the pan/tilt mechanism 32.

The control unit 40 mainly comprises a signal processing unit 41, an object detection unit 65, an imaging control unit 42, a lens control unit 43, a pan/tilt control unit 44, and an operation control unit 46.

The signal processing unit 41 performs signal processing, such as an offset process, a gain control process including white balance correction and sensitivity correction, a gamma correction process, demosaic processing (demosaicing process), and an RGB/YC conversion process, for a digital image signal which is input from the imaging unit 20. Here, the demosaicing process is a process which calculates all color information of each pixel from a mosaic image corresponding to the color filter array of a single-plate-type color imaging element and is also referred to as a synchronization process. For example, in the case of an imaging element including color filters of three colors, that is, R, G, and B, the demosaicing process calculates the color information of all of R, G, and B of each pixel from an RGB mosaic image. In addition, the RGB/YC conversion process is a process which generates brightness data Y and color difference data items Cb and Cr from the demosaiced RGB image data.

When an object which is a tracking target is specified, the object detection unit 65 has a function that detects the object even if the object moves. Specifically, first, an object to be tracked is automatically or manually set and the image of the object to be tracked is detected from the captured moving images which are sequentially obtained from the signal processing unit 41 by a face detection process or a pattern matching process. Since the face detection process or the pattern matching process performed in the object detection unit 65 has been well known, the description thereof will be omitted here. In addition, in a case in which a moving body is an object, the object may be detected by a moving body detection process as another method for detecting the object.

The imaging control unit 42 issues, for example, an instruction to discharge the charge accumulated in a capacitor of each pixel of the imaging element 24 or an instruction to read a signal corresponding to the charge accumulated in the capacitor through the CMOS driver 28 and the TG 29 and performs imaging control.

The lens control unit 43 controls the focus lens, the variable magnification lens, and the diaphragm 23 included in the imaging lens 22 through the lens driving unit 26 and performs, for example, auto focus (AF) control for moving the focus lens to an in-focus position. The AF control is performed by integrating the absolute values of high-frequency components of a digital signal corresponding to an AF area, detecting an in-focus position where the integrated value (AF evaluation value) is the maximum, and moving the focus lens to the detected in-focus position.

The pan/tilt control unit 44 controls the pan/tilt device 30. Specifically, in a case in which an automatic tracking mode is set, the pan/tilt control unit 44 controls the pan/tilt device 30 such that the object detected by the object detection unit 65 is located at the center of the angle of view. In a case in which the automatic tracking mode is not set, the pan/tilt control unit 44 controls the pan/tilt device 30 in response to instructions transmitted from the pan/tilt operation device 100.

The operation control unit 46 controls the operation of the signal processing unit 41, the object detection unit 65, the imaging control unit 42, the lens control unit 43, and the pan/tilt control unit 44. For example, the operation control unit 46 controls the pan/tilt control unit 44 such that the pan/tilt mechanism 32 is operated or is stopped. In addition, the operation control unit 46 controls the pan/tilt mechanism 32 through the pan/tilt control unit 44 such that the object detection unit 65 tracks the detected object. The operation control unit 46 stops the recording a captured moving image on the memory 62 or cancels the stop. The operation control unit 46 stops the capture of a moving image by the imaging unit 20 to change the operation mode to a power saving mode or cancels the power saving mode.

The wireless communication unit 50 performs wireless communication with an external terminal, such as the smart phone 100 illustrated in FIG. 1, and receives various operation instructions input from the smart phone 100 using wireless communication. In addition, the wireless communication unit 50 transmits, for example, an image to be recorded to the smart phone 100. Furthermore, when the imaging unit 20 captures a moving image and the signal processing unit 41 processes the moving image, the wireless communication unit 50 can transmit the processed image (live view image) to the smart phone 100. In this way, the image to be recorded, such as a moving image, can be recorded on a recording medium which is provided in the smart phone 100 or an external recording medium, or a live view image can be displayed on a display unit (display input unit 120) of the smart phone 100.

The operating unit 60 includes, for example, an imaging start button 19 (FIG. 1) and a power button which are provided in the device body 12 and can be used to input an operation instruction similar to the operation instruction from the smart phone 100.

The camera-side display unit 61 functions as an image display unit which displays, for example, a live view image and a playback image and also functions as a user interface unit (UI unit) for displaying a menu screen and for setting and inputting various parameters, in cooperation with the operating unit 60.

The memory (recording unit) 62 includes, for example, a synchronous dynamic random access memory (SDRAM) serving as a storage area that temporarily stores still images or moving images or a work area that performs various types of arithmetic processing or a read only memory (ROM) that stores an imaging program and various kinds of data required for control. For example, the memory 62 stores threshold values used to determine whether to stop the pan/tilt mechanism 32, whether to cancel the stop, whether to stop the recording of a moving image, whether to cancel the stop, and whether to switch the operation mode to the power saving mode. In addition, the operation control unit 46 controls the recording of the moving image captured by the imaging unit 20 on the memory 62.

The motion sensor 64 detects the movement of the pan/tilt camera 10. That is, the motion sensor 64 detects a physical amount related to the movement of the pan/tilt camera 10 in a case in which the pan/tilt camera 10 is moved by a certain external force. The motion sensor 64 is not particularly limited and any type of motion sensor may be used as long as it can detect the movement of the pan/tilt camera 10. For example, an acceleration sensor, an angular velocity sensor, an atmospheric pressure sensor, and a global positioning system (GPS) are used as the motion sensor 64. The motion sensor 64 may detect the movement of the pan/tilt camera 10, using a motion vector of a captured image. Specifically, example of the physical amount related to the movement of the pan/tilt camera 10 include acceleration, angular acceleration, a speed, angular velocity, the amount of movement (a motion vector and angular displacement).

Figure 4:
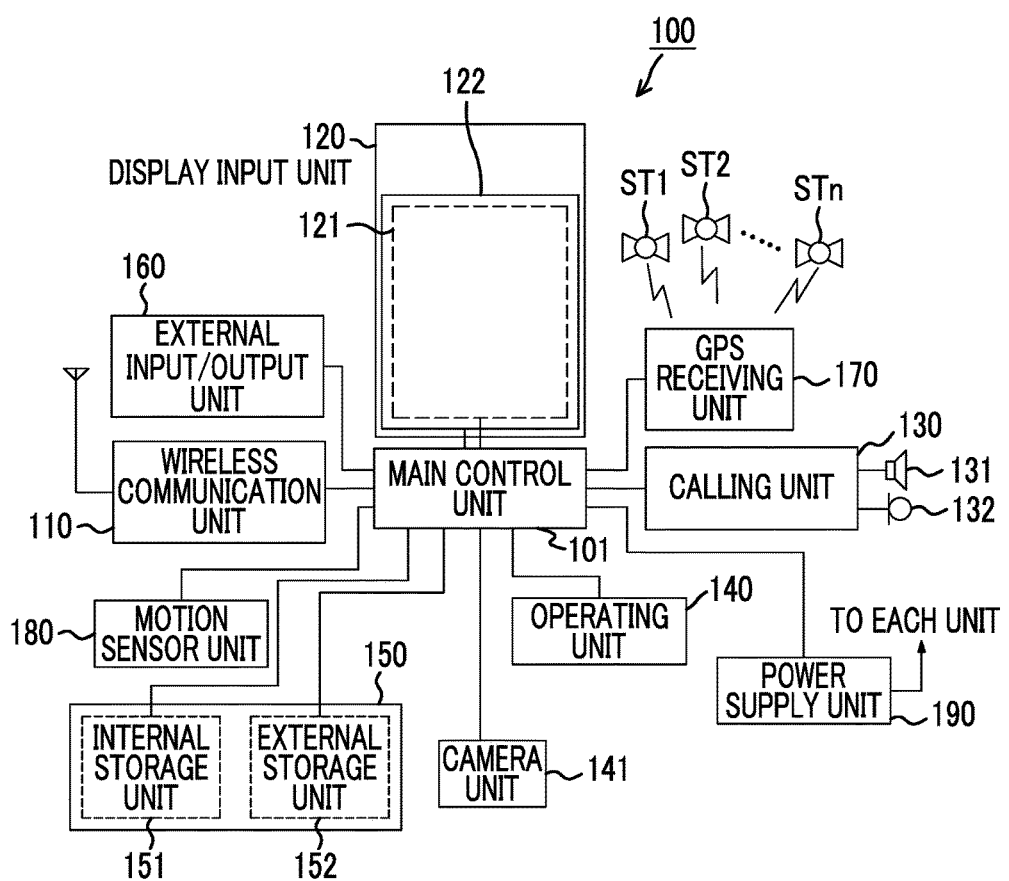
FIG. 4 is a block diagram illustrating an example of the internal structure of a smart phone.

FIG. 4 is a block diagram illustrating an example of the internal structure of the smart phone 100 illustrated in FIG. 1.

As illustrated in FIG. 4, the smart phone 100 comprises, as main components, a wireless communication unit 110, the display input unit 120, a calling unit 130, an operating unit 140, a camera unit 141, a storage unit 150, an external input/output unit 160, a global positioning system (GPS) receiving unit 170, a motion sensor unit 180, a power supply unit 190, and a main control unit 101. In addition, the smart phone 100 has, as a main function, a wireless communication function which performs mobile wireless communication through a base station apparatus BS and a mobile communication network NW.

The wireless communication unit 110 performs wireless communication with the base station apparatus BS which is accommodated in the mobile communication network NW in response to an instruction from the main control unit 101. The wireless communication is used to transmit and receive various types of file data, such as voice data and image data, and electronic mail data or to receive, for example, web data or streaming data. In this example, the wireless communication unit 110 of the smart phone 100 transmits various operation instruction inputs to the pan/tilt camera 10 or receives, for example, a live view image and an image to be recorded from the pan/tilt camera 10.

The display input unit 120 displays, for example, images (still images and moving images) or text information to visually transmit information to the user and detects the user's operation for the displayed information under the control of the main control unit 101. The display input unit 120 comprises a display panel 121 and an operation panel (touch panel) 122. It is preferable that the display panel 121 is a 3D display panel in a case in which a 3D image is viewed.

The display panel 121 uses, for example, a liquid crystal display (LCD) or an organic electro-luminescence display (OELD) as a display device.

The operation panel 122 is a device that is provided such that an image displayed on a display surface of the display panel 121 is visually recognized and detects one or a plurality of coordinate points operated by a finger of the user or a stylus. When the device is operated by a finger of the user or a stylus, a detection signal which is generated by the operation is output to the main control unit 101. Then, the main control unit 101 detects an operation position (coordinates) on the display panel 121 on the basis of the received detection signal.

As illustrated in FIG. 1, the display panel 121 and the operation panel 122 of the smart phone 100 are integrated to form the display input unit 120 and the operation panel 122 is provided so as to completely cover the display panel 121. In a case in which this structure is used, the operation panel 122 may have a function of detecting the user's operation even in a region other than the display panel 121. In other words, the operation panel 122 may comprise a detection region (hereinafter, referred to as a display region) for an overlap portion which overlaps the display panel 121 and a detection region (hereinafter, referred to as a non-display region) for an outer edge portion which does not overlap the display panel 121.

The size of the display region may be exactly equal to the size of the display panel 121. However, the sizes are not necessarily equal to each other. The operation panel 122 may comprise two sensitive regions, that is, an outer edge portion and an inner portion other than the outer edge portion. The width of the outer edge portion is appropriately designed according to, for example, the size of the housing 102. Examples of a position detecting method which is used in the operation panel 122 include a matrix switching method, a resistive film method, a surface elastic wave method, an infrared method, an electromagnetic induction method, and a capacitive sensing method. Any of the methods may be used.

The calling unit 130 comprises a speaker 131 and a microphone 132. The calling unit 130 converts the voice of the user which is input through the microphone 132 into voice data which can be processed by the main control unit 101 and outputs the converted voice data to the main control unit 101. In addition, the calling unit 130 decodes voice data received by the wireless communication unit 110 or the external input/output unit 160 and outputs the decoded voice data from the speaker 131. As illustrated in FIG. 1, for example, the speaker 131 and the microphone 132 can be mounted on the same surface as the display input unit 120.

The operating unit 140 is a hardware key which uses, for example, a key switch and receives instructions from the user. For example, the operating unit 140 is a push button switch which is mounted on a lower portion and a lower surface of the display input unit 120 of the housing 102 of the smart phone 100, is turned on when it is pressed by, for example, a finger, and is turned off by the restoring force of a spring when the finger is taken off.

The storage unit 150 stores a control program or control data of the main control unit 101, address data which is associated with, for example, the names or phone numbers of communication partners, and transmitted and received electronic mail data, web data which is downloaded by web browsing, or downloaded content data. In addition, the storage unit 150 temporarily stores, for example, streaming data. The storage unit 150 includes an internal storage unit 151 which is provided in the smart phone and an external storage unit 152 which has a slot for a detachable and attachable external memory. The internal storage unit 151 and the external storage unit 152 forming the storage unit 150 may be implemented by a storage medium, such as a flash memory, a hard disk, a multimedia-card-micro-type memory, a card-type memory (for example, a MicroSD (registered trademark) memory), a random access memory (RAM), or a read only memory (ROM).

The external input/output unit 160 functions as an interface with all of the external apparatuses connected to the smart phone 100 and is directly or indirectly connected to other external apparatuses by communication (for example, universal serial bus (USB) communication or IEEE1394) or a network (for example, the Internet, a wireless local area network (LAN), a Bluetooth (registered trademark) network, a radio frequency identification (RFID) network, an infrared data association (IrDA (registered trademark)) network, an ultra wideband (UWB) (registered trademark) network, or a ZigBee (registered trademark) network).

Examples of the external apparatus connected to the smart phone 100 include a wired/wireless headset, a wired/wireless external charger, a wired/wireless data port, a memory card which is connected through a card socket, a subscriber identity module (SIM)/user identity module (UIM) card, an external audio/video apparatus which is connected through an audio/video input/output (I/O) terminal, a wirelessly connected external audio/video apparatus, a smart phone which is connected wirelessly or in a wired manner, a personal computer which is connected wirelessly or in a wired manner, a personal digital assistant (PDA) which is connected wirelessly or in a wired manner, and an earphone. The external input/output unit 160 can transmit data which is received from the external apparatus to each component of the smart phone 100 or can transmit data in the smart phone 100 to the external apparatus.

The GPS receiving unit 170 receives GPS signals transmitted from GPS satellites ST1 to STn and performs a position measurement process on the basis of a plurality of received GPS signals to detect a position including the latitude, longitude, and height of the smart phone 100, in response to an instruction from the main control unit 101. When the GPS receiving unit 170 can acquire positional information from the wireless communication unit 110 or the external input/output unit 160 (for example, a wireless LAN), it can detect the position using the positional information.

The motion sensor unit 180 comprises, for example, a triaxial acceleration sensor and detects the physical movement of the smart phone 100 in response to an instruction from the main control unit 101. When the physical movement of the smart phone 100 is detected, the moving direction or acceleration of the smart phone 100 is detected. The detection result is output to the main control unit 101.

The power supply unit 190 supplies power which is stored in a battery (not illustrated) to each unit of the smart phone 100 in response to an instruction from the main control unit 101.

The main control unit 101 comprises a microprocessor, operates on the basis of the control program or control data stored in the storage unit 150, and controls the overall operation of each unit of the smart phone 100. The main control unit 101 has an application processing function and a mobile communication control function of controlling each unit of a communication system in order to perform voice communication or data communication through the wireless communication unit 110.

The application processing function is implemented by the operation of the main control unit 101 based on the application software which is stored in the storage unit 150. Examples of the application processing function include an infrared communication function which controls the external input/output unit 160 such that data communication with an opposing apparatus is performed, an electronic mail function which transmits and receives electronic mail, and a web browsing function which browses web pages.

The main control unit 101 has, for example, an image processing function that displays an image on the display input unit 120 on the basis of image data (still image or moving image data) such as received data or downloaded streaming data. The image processing function means the function of the main control unit 101 decoding the image data, performing image processing for the decoding result, and displaying the image on the display input unit 120.

The main control unit 101 performs display control for the display panel 121 and operation detection control for detecting the operation of the user through the operating unit 140 and the operation panel 122.

The main control unit 101 performs display control to display a software key, such as an icon for starting application software or a scroll bar, or to display a window for creating electronic mail. The scroll bar means a software key for receiving an instruction to move a displayed portion of an image that is too large to fit into the display region of the display panel 121.

The main control unit 101 performs operation detection control to detect the operation of the user through the operating unit 140 and the operation panel 122.

The main control unit 101 performs the operation detection control to detect the operation of the user through the operating unit 140, to receive an operation for the icon or the input of a character string to an input field of the window through the operation panel 122, or to receive a request to scroll the displayed image through the scroll bar.

The main control unit 101 has a touch panel control function that performs the operation detection control to determine whether the position of an operation for the operation panel 122 is an overlap portion (display region) which overlaps the display panel 121 or an outer edge portion (non-display region) which does not overlap the display panel 121 other than the overlap portion and controls a sensitive region of the operation panel 122 or the display position of the software key.

The main control unit 101 can detect a gesture operation for the operation panel 122 and can perform a predetermined function according to the detected gesture operation. The gesture operation does not mean a simple touch operation according to the related art, but means an operation which draws a trace using a finger, an operation which designates a plurality of positions at the same time, or a combination thereof which draws a trace for at least one of the plurality of positions.

The camera unit 141 is a digital camera which captures an electronic image using an imaging element such as a complementary metal oxide semiconductor (CMOS) or a charge-coupled device (CCD).

The camera unit 141 can convert captured image data into image data which is compressed in, for example, a Joint Photographic Coding Experts Group (JPEG) format and record the converted image data in the storage unit 150 or output the converted image data through the external input/output unit 160 or the wireless communication unit 110, under the control of the main control unit 101.

As illustrated in FIG. 1, the camera unit 141 is mounted on the same surface as the display input unit 120 in the smart phone 100. However, the mounting position of the camera unit 141 is not limited thereto. For example, the camera unit 141 may be mounted on the rear surface of the display input unit 120 or a plurality of camera units 141 may be mounted. In a case in which a plurality of camera units 141 are mounted, the camera units 141 which are used to capture images may be switched such that a single camera unit captures images or the plurality of camera units 141 may be simultaneously used to capture images.

The camera unit 141 can be used for various functions of the smart phone 100. For example, the image captured by the camera unit 141 can be displayed on the display panel 121 or the image captured by the camera unit 141 can be used as one of the operation inputs of the operation panel 122. When detecting the position, the GPS receiving unit 170 may detect the position with reference to the image from the camera unit 141. In addition, the optical axis direction of the camera unit 141 in the smart phone 100 may be determined or the current usage environment may be determined, with reference to the image from the camera unit 141, using the triaxial acceleration sensor or without using the triaxial acceleration sensor. Of course, the image from the camera unit 141 may be used in the application software.

In this example, application software for operating the pan/tilt camera 10 is downloaded through, for example, a network and is stored in the storage unit 150. The main control unit 101 is operated by the application processing function of the smart phone 100 according to the downloaded application software to make the general-purpose smart phone 100 function as a user interface unit (UI unit) for operating the pan/tilt camera 10.

<First Embodiment>

Next, a first embodiment of the invention will be described. In this embodiment, the operation of the pan/tilt mechanism 32 is controlled on the basis of the physical amount (hereinafter, referred to as, the "amount of movement") related to the movement of the pan/tilt camera 10 and a "first threshold value" and a "first resumption threshold value" which will be described below.

Figure 5:
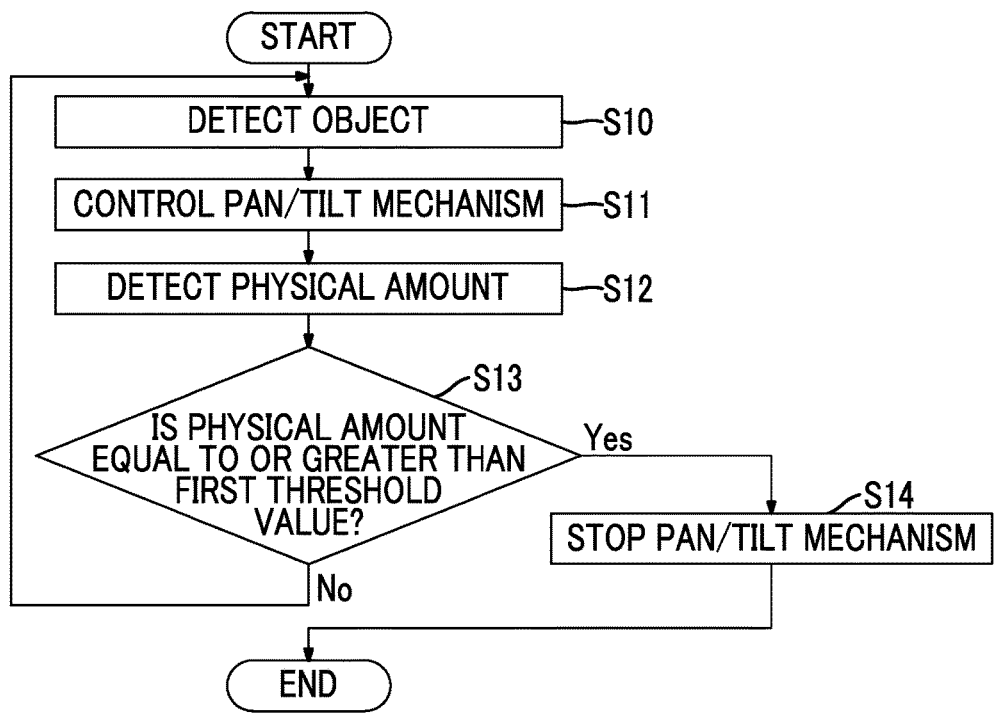
FIG. 5 is a flowchart illustrating the operation of a pan/tilt camera according to a first embodiment.

FIG. 5 is a flowchart illustrating the operation of the pan/tilt camera 10 according to this embodiment.

First, the object detection unit 65 detects an object to be tracked from a moving image captured by the imaging unit 20 (a object detection step: Step S10). Then, the pan/tilt control unit 44 controls the pan/tilt mechanism 32 such that the object detected by the object detection unit 65 is tracked (a pan/tilt control step: Step S11). Specifically, the pan/tilt control unit 44 controls the pan driving unit 34 and the tilt driving unit 36 such that the object detected by the object detection unit 65 is located at the center of a screen (display input unit 120).

While the pan/tilt camera 10 is in an on state, the motion sensor 64 of the pan/tilt camera 10 always detects the amount of movement of the pan/tilt camera 10 and transmits the amount of movement to the operation control unit 46 (a motion detection step: Step S12). In a case in which the amount of movement of the pan/tilt camera 10 detected by the motion sensor 64 is equal to or greater than a first threshold value (Yes in Step S13), the operation control unit 46 stops the operation of the pan/tilt mechanism 32 through the pan/tilt control unit 44 (a operation control step: Step S14). On the other hand, in a case in which the amount of movement of the pan/tilt camera 10 detected by the motion sensor 64 is less than the first threshold value (No in Step S13), the process returns to Step S10 and Steps S10 to S13 are repeated with a predetermined period or a variable period corresponding to the amount of movement of the object. It is preferable that, even if the pan/tilt mechanism 32 is stopped, the imaging unit 20 continues to track the object in the captured image. That is, in a case in which the pan/tilt mechanism 32 is stopped and the object is present in the image captured by the imaging unit 20, it is possible to detect the object. The first threshold value can be set to, for example, the amount of movement of the pan/tilt camera 10 in which the object moves out of the search range (the maximum range is the range of the angle of view) of the object that is being automatically tracked.

The invention can be implemented by a program that causes a computer to perform each step of the above-mentioned flowchart. In this case, the program can be stored in a computer-readable (non-transitory) storage medium.

As such, in this embodiment, in a case in which the pan/tilt camera 10 is moved by external force, the tracking of the object by the pan/tilt mechanism 32 is stopped. Therefore, it is possible to prevent the problems that occur when the object is not normally tracked.

Figure 6:
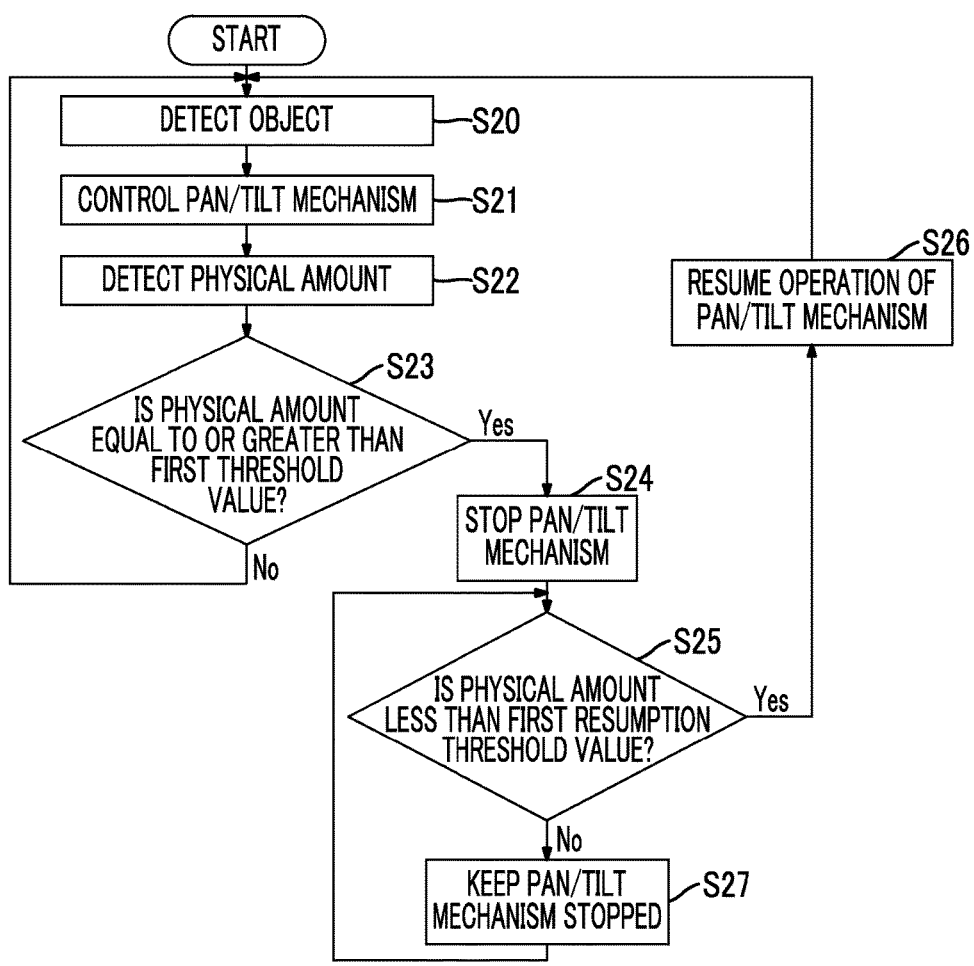
FIG. 6 is a flowchart illustrating the operation of the pan/tilt camera according to the first embodiment.

FIG. 6 is a flowchart illustrating the operation of the pan/tilt camera 10 when the operation of the pan/tilt mechanism 32 of the pan/tilt camera 10 is stopped (which has been described in FIG. 5) and is then resumed.

In FIG. 6, Steps S20 to S24 correspond to Steps S10 to S14 in FIG. 5, respectively. That is, first, the object detection unit 65 detects the object to be tracked (Step S20). Then, the pan/tilt control unit 44 controls the pan/tilt mechanism 32 such that the object is tracked (Step S21). The motion sensor 64 detects the amount of movement of the pan/tilt camera 10 (Step S22). The operation control unit 46 determines whether the detected amount of movement is equal to or greater than the first threshold value (Step S23). In a case in which the amount of movement is equal to or greater than the first threshold value, the operation control unit 46 stops the operation of the pan/tilt mechanism 32 (Step S24). On the other hand, in a case in which the amount of movement is less than the first threshold value (No in Step S23), the process returns to Step S20.

Here, even if the pan/tilt mechanism 32 is in a stopped state, the motion sensor 64 continues to detect the amount of movement of the pan/tilt camera 10. Then, in a case in which it is determined that the amount of movement detected by the motion sensor 64 is less than the first resumption threshold value (Yes in Step S25), the operation control unit 46 directs the pan/tilt control unit 44 to resume the operation of the pan/tilt mechanism 32 (Step S26). On the other hand, in a case in which it is determined that the amount of movement detected by the motion sensor 64 is equal to or greater than the first resumption threshold value (No in Step S25), the operation control unit 46 keeps the pan/tilt mechanism 32 stopped (Step S27). The first resumption threshold value is set to be less than the first threshold value and hysteresis is set between the stop of the pan/tilt mechanism 32 and the resumption of the operation of the pan/tilt mechanism 32. The process in the above-mentioned operation flow can be interrupted or stopped in response to an operation of turning off the pan/tilt camera 10 or an operation input from the user.

As described above, in a case in which the amount of movement of the pan/tilt camera 10 detected by the motion sensor 64 is equal to or greater than the first threshold value, the operation control unit 46 stops the pan/tilt mechanism 32. Therefore, in this embodiment, it is possible to prevent an abnormal operation of the pan/tilt camera 10 due to abnormal object tracking. In a case in which the amount of movement is less than first resumption threshold value, the operation control unit 46 resumes the operation of the pan/tilt mechanism 32 in the stopped state to track the object. Therefore, in this embodiment, in a case in which the movement of the pan/tilt camera 10 is stopped, the tracking of the object is resumed.

<Modification Example of First Embodiment>

Next, a modification example of the first embodiment will be described. In the modification example of the first embodiment, the first threshold value includes a threshold value in the pan direction and a threshold value in the tilt direction which is different from the threshold value in the pan direction.

The first threshold value may include a first horizontal direction threshold value which is related to the movement of the camera body in the horizontal direction (pan direction) and a first vertical direction threshold value which is related to the movement of the camera body in the vertical direction (tilt direction) and is different from the first horizontal direction threshold value. In a case in which the pan/tilt mechanism 32 is operated to track the object, the influence of movement in the pan direction on the tracking of the object is different from the influence of movement in the tilt direction on the tracking of the object. Therefore, different threshold values are set in the pan direction and the tilt direction, which makes it possible to more effectively control the pan/tilt mechanism 32 on the basis of the amount of movement.

In this example, the physical amounts detected by the motion sensor 64 include physical amounts (the amounts of movement) related to the movement of the camera body in the horizontal direction and the vertical direction. In this example, in a case in which the amount of movement in the horizontal direction detected by the motion sensor 64 is equal to or greater than the first horizontal direction threshold value or in a case in which the amount of movement in the vertical direction detected by the motion sensor 64 is equal to or greater than the first vertical direction threshold value, the operation control unit 46 directs the pan/tilt control unit 44 to stop the pan/tilt mechanism 32.

Figure 7:
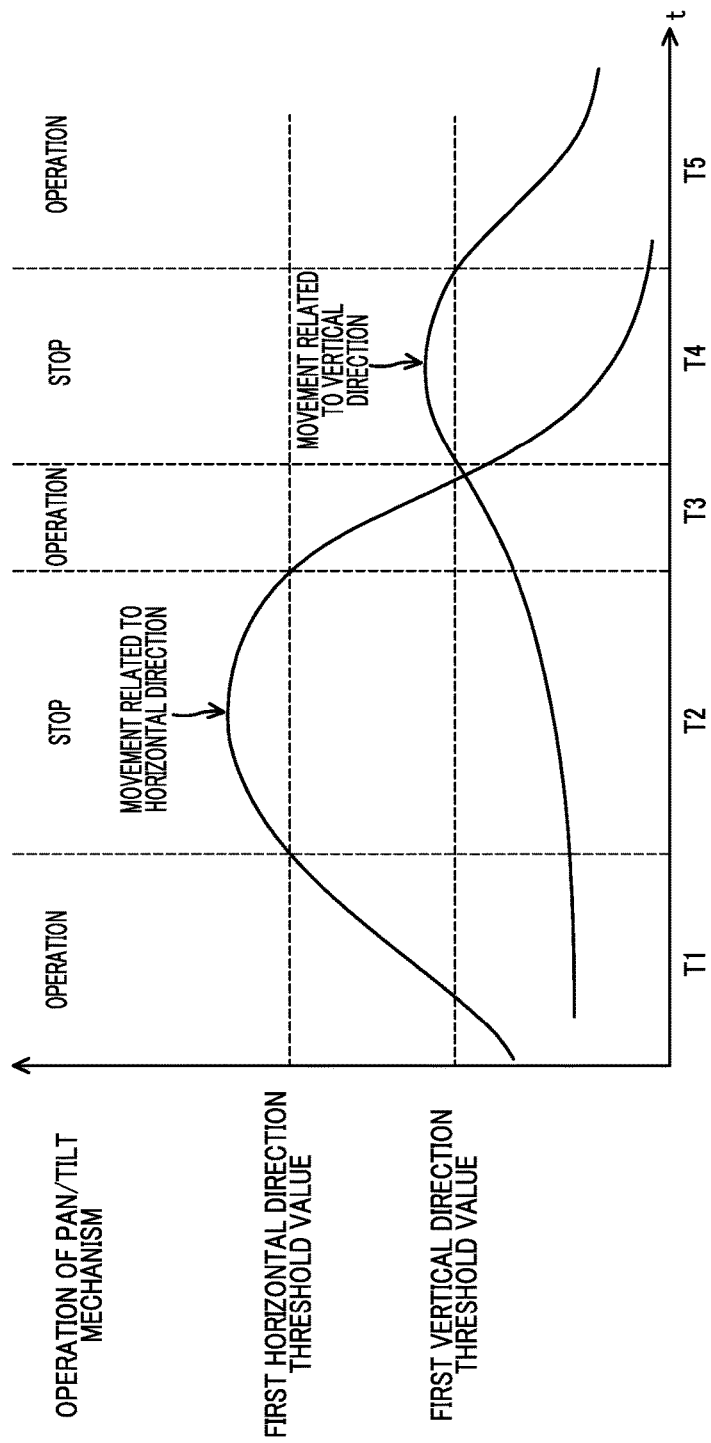
FIG. 7 is a graph illustrating the relationship between a first horizontal direction threshold value and a first vertical direction threshold value, and the operation of a pan/tilt mechanism.

FIG. 7 is a graph illustrating the relationship between the first horizontal direction threshold value and the first vertical direction threshold value, and the operation of the pan/tilt mechanism 32. FIG. 7 illustrates the amount of movement in the horizontal direction and the amount of movement in the vertical direction which are detected by the motion sensor 64. In addition, FIG. 7 illustrates the stop or operation of the pan/tilt mechanism 32 for periods T1 to T5. In FIG. 7, for simplicity of explanation, the first resumption threshold value is not considered.

For the periods T1, T3, and T5, the pan/tilt mechanism 32 is operated to track the object since the amount of movement in the horizontal direction is less than the first horizontal direction threshold value and the amount of movement in the vertical direction is less than the first vertical direction threshold value. In contrast, for the period T2, the pan/tilt mechanism 32 is stopped since the amount of movement in the vertical direction is less than the first vertical direction threshold value and the amount of movement in the horizontal direction is equal to or greater than the first horizontal direction threshold value. For the period T4, the pan/tilt mechanism 32 is stopped since the amount of movement in the horizontal direction is less than the first horizontal direction threshold value and the amount of movement in the vertical direction is equal to or greater than the first vertical direction threshold value.

As described above, according to this example, different threshold values are set in the pan direction and the tilt direction and the operation of the pan/tilt mechanism 32 is controlled on the threshold values. Therefore, it is possible to more effectively control the operation of the pan/tilt mechanism 32 according to the movement of the pan/tilt camera 10.

<Second Embodiment>

Next, a second embodiment of the invention will be described. In this embodiment, a moving image recording operation is controlled on the basis of the amount of movement of the pan/tilt camera 10 and a "second threshold value" and a "second resumption threshold value" which will be described below.

Figure 8:
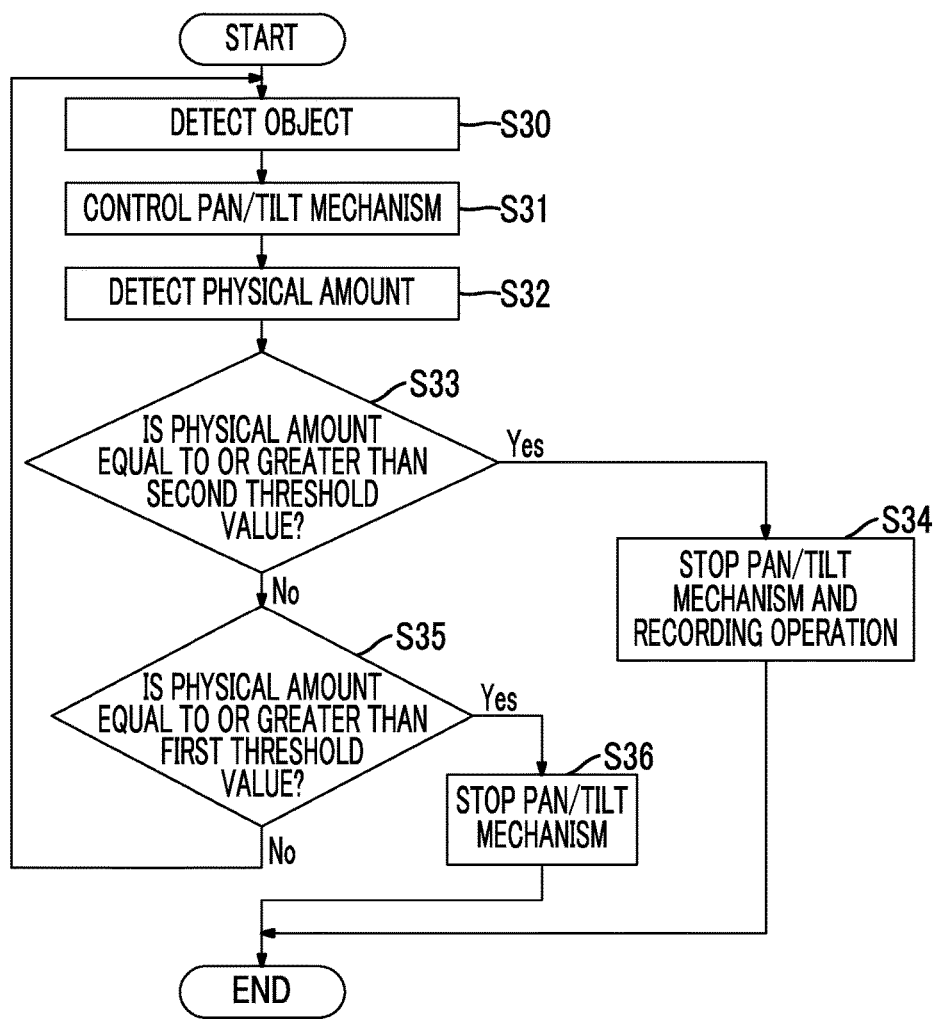
FIG. 8 is a flowchart illustrating the operation of a pan/tilt camera according to a second embodiment.

FIG. 8 is a flowchart illustrating the operation of the pan/tilt camera 10 according to this embodiment.

First, the object detection unit 65 detects an object to be tracked from a moving image captured by the imaging unit 20 (Step S30). Then, the pan/tilt control unit 44 controls the pan/tilt mechanism 32 such that the object detected by the object detection unit 65 is tracked (Step S31). The motion sensor 64 detects the amount of movement of the pan/tilt camera 10 (Step S32).

Then, in a case in which the amount of movement of the pan/tilt camera 10 detected by the motion sensor 64 is equal to or greater than the second threshold value (Yes in Step S33), the operation control unit 46 stops the pan/tilt mechanism 32 and stops the recording of the captured moving image on the recording unit (Step S34). Even if the pan/tilt mechanism 32 is stopped and the recording of the captured moving image is stopped, the imaging unit 20 may continue to track the object in the captured image.

On the other hand, in a case in which the amount of movement of the pan/tilt camera 10 detected by the motion sensor 64 is less than the second threshold value (No in Step S33), the operation control unit 46 determines whether the amount of movement is equal to or greater than the first threshold value (Step S35). In a case in which the amount of movement of the pan/tilt camera body detected by the motion sensor 64 is equal to or greater than the first threshold value (Yes in Step S35), the operation control unit 46 stops the operation of the pan/tilt mechanism 32 through the pan/tilt control unit 44 (Step S36). On the other hand, in a case in which the amount of movement of the pan/tilt camera body detected by the motion sensor 64 is less than the first threshold value (No in Step S35), the process returns to Step S30. The second threshold value is determined considering the quality of the moving image to be recorded. For example, the second threshold value is set considering the amount of movement in the range in which the observer who observes the moving image to be recorded does not feel discomfort.

As described above, in a case in which the amount of movement is equal to or greater than the second threshold value, the recording of the captured moving image is stopped. Therefore, it is possible to record only the image of which the visual quality has been ensured.

Figure 9:
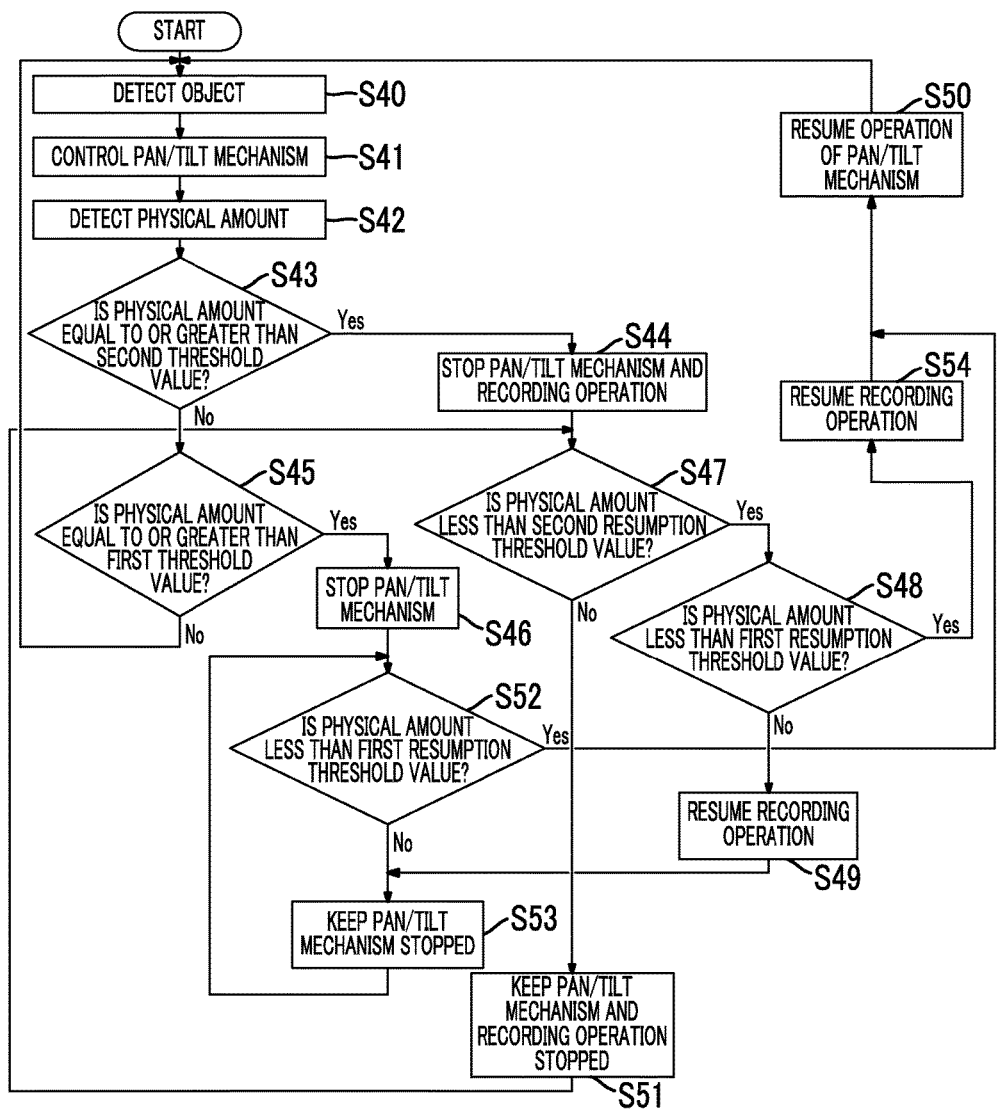
FIG. 9 is a flowchart illustrating the operation of the pan/tilt camera according to the first embodiment.

FIG. 9 is a flowchart illustrating the operation of the pan/tilt camera 10 in a case in which the operation of the pan/tilt mechanism 32 and the recording operation are resumed after the pan/tilt mechanism 32 of the pan/tilt camera 10 is stopped and the image recording operation is stopped (which has been described in FIG. 8).

In FIG. 9, Steps S40 to S46 correspond to Steps S30 to S36 in FIG. 8, respectively. That is, first, the object detection unit 65 detects the object to be tracked (Step S40). Then, the pan/tilt control unit 44 controls the pan/tilt mechanism 32 such that the object is tracked (Step S41). The motion sensor 64 detects the amount of movement of the pan/tilt camera 10 (Step S42). Then, in a case in which the amount of movement is equal to or greater than the second threshold value (Yes in Step S43), the operation control unit 46 stops the operation of the pan/tilt mechanism 32 and stops the recording of a moving image (image) in the recording unit (Step S44).

On the other hand, in a case in which the amount of movement is less than the second threshold value (No in Step S43), the operation control unit 46 determines whether the amount of movement is equal to or greater than the first threshold value (Step S45). Then, in a case in which the amount of movement of the camera body detected by the motion sensor 64 is equal to or greater than the first resumption threshold value (Yes in Step S45), the operation control unit 46 stops the operation of the pan/tilt mechanism 32 through the pan/tilt control unit 44 (Step S46). On the other hand, in a case in which the amount of movement of the camera body detected by the motion sensor 64 is less than the first resumption threshold value (No in Step 45), the process returns to Step S40.

Even if the pan/tilt mechanism 32 is maintained in a stopped state, the motion sensor 64 continues to detect the amount of movement of the pan/tilt camera 10 and transmits the detected amount of movement to the operation control unit 46. Then, in a case in which it is determined that the amount of movement detected by the motion sensor 64 is less than the second resumption threshold value (Yes in Step S47), the operation control unit 46 determines whether the amount of movement is less than the first resumption threshold value (Step S48). Then, in a case in which the amount of movement is less than the first resumption threshold value (Yes in Step S48), the operation control unit 46 resumes the operation of recording the image in the memory 62 (Step S54) and operates the pan/tilt mechanism 32 to resume the tracking of the object (Step S50). In a case in which the image recording operation is resumed, a process of notifying the user that the recording operation has been resumed may be performed. For example, the operation control unit 46 outputs a signal such that a confirmation notice indicating the resumption of the recording operation is displayed on the display input unit 120 of the smart phone 100. In a case in which the amount of movement is less than the first resumption threshold value (No in Step S48), the operation control unit 46 resumes only the image recording operation (Step S49). In a case in which it is determined that the amount of movement detected by the motion sensor 64 is equal to or greater than the second resumption threshold value (No in Step S47), the operation control unit 46 keeps the pan/tilt mechanism 32 and the recording operation stopped (Step S51). In a case in which the state in which the amount of movement detected by the motion sensor 64 is equal to or greater than the second resumption threshold value is maintained for a predetermined period of time, the operation control unit 46 may turn off the pan/tilt camera 10. In this case, the state in which the pan/tilt camera 10 is turned on can be maintained for a short time even in a state in which the moving image is not recorded. Therefore, it is possible to effectively use power.

Even in a case in which the pan/tilt mechanism 32 is stopped, the motion sensor 64 continues to detect the amount of movement of the pan/tilt camera 10. In a case in which the amount of movement is less than the first resumption threshold value (Yes in Step S52), the operation control unit 46 operates the pan/tilt mechanism 32 to resume the tracking of the object. On the other hand, in a case in which the amount of movement is equal to or greater than the first resumption threshold value (No in Step S52), the operation control unit 46 keeps the pan/tilt mechanism 32 stopped (Step S53). As such, in a case in which amount of movement of the pan/tilt camera 10 is less than the second resumption threshold value and the first resumption threshold value, the image recording operation and the tracking of the object by the pan/tilt mechanism 32 are resumed (Step S50). The second resumption threshold value is set to be less than the second threshold value and hysteresis is provided between the stop of the pan/tilt mechanism 32 and the resumption of the operation of the pan/tilt mechanism 32. The process in the above-mentioned operation flow can be interrupted or stopped in response to an operation of turning off the pan/tilt camera 10 or an operation input from the user.

As described above, in a case in which the amount of movement of the pan/tilt camera 10 detected by the motion sensor 64 is equal to or greater than the second threshold value, the operation control unit 46 stops the recording to a captured moving image. Therefore, in this embodiment, it is possible to record only a high-quality image. In a case in which the amount of movement is less than the second resumption threshold value, the operation control unit 46 resumes the image recording operation in the stopped state.

<Third Embodiment>

Next, a third embodiment will be described. In this embodiment, a power saving mode in which the capture of a moving image is stopped is controlled on the basis of the amount of movement of the pan/tilt camera 10 and a "third threshold value" and a "third resumption threshold value" which will be described below.

Figure 10:
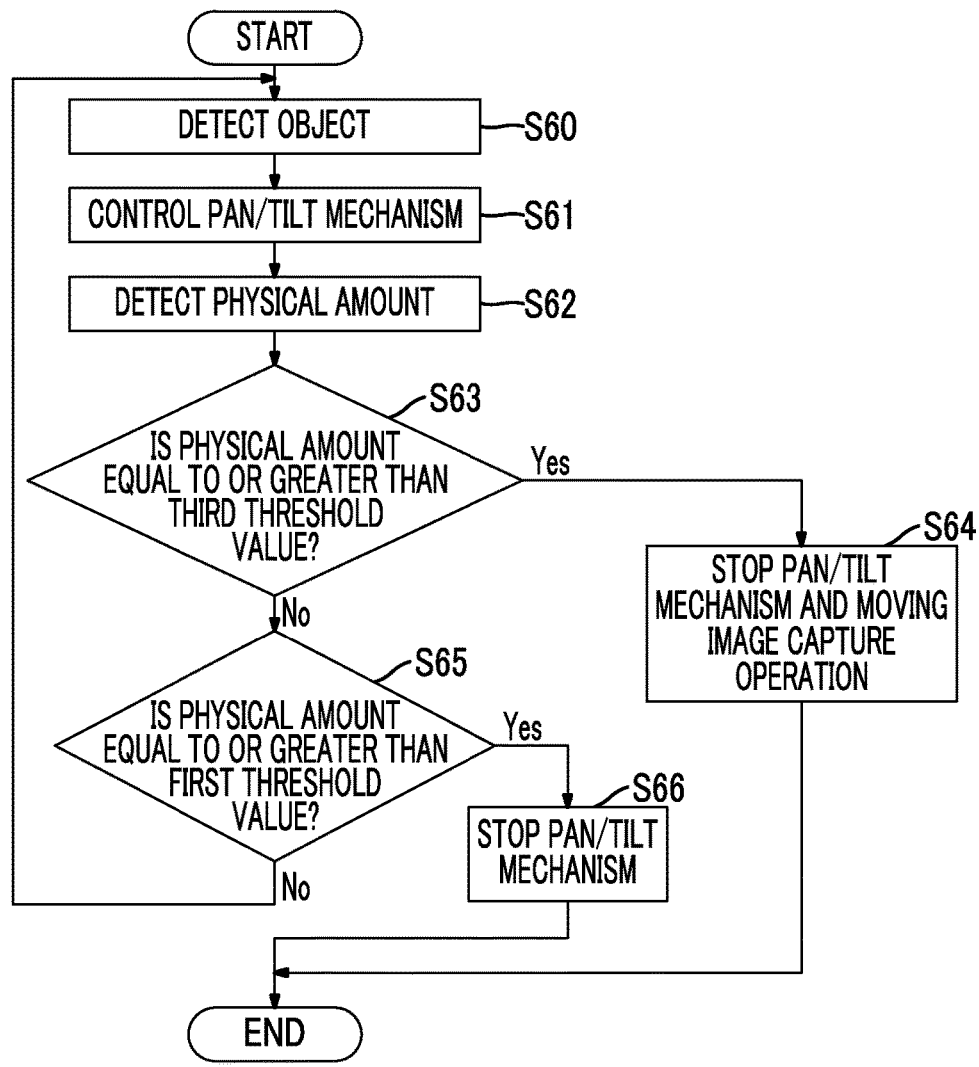
FIG. 10 is a flowchart illustrating the operation of a pan/tilt camera according to a third embodiment.

FIG. 10 is a flowchart illustrating the operation of the pan/tilt camera 10 according to this embodiment.

First, the object detection unit 65 detects an object to be tracked from a moving image captured by the imaging unit 20 (Step S60). Then, the pan/tilt control unit 44 controls the pan/tilt mechanism 32 such that the object detected by the object detection unit 65 is tracked (Step S61). The motion sensor 64 detects the amount of movement of the pan/tilt camera 10 (Step S62).

Then, in a case in which the amount of movement of the pan/tilt camera 10 detected by the motion sensor 64 is equal to or greater than the third threshold value (Yes in Step S63), the operation control unit 46 stops the pan/tilt mechanism 32 and stops the capture of moving images by the imaging unit 20 (Step S64). Here, the stop of the moving image capture operation of the imaging unit 20 means that the imaging unit 20 does not capture a moving image and does not capture a recording moving image and a preview image. Therefore, in a case in which the imaging unit 20 does not capture a moving image, the pan/tilt camera 10 is in the power saving mode in which power consumption is reduced.

Then, in a case in which the amount of movement of the pan/tilt camera 10 detected by the motion sensor 64 is less than the third threshold value (No in Step S63), the operation control unit 46 determines whether the amount of movement is equal to or greater than the first threshold value (Step S65). Then, in a case in which the amount of movement of the camera body detected by the motion sensor 64 is equal to or greater than the first threshold value (Yes in Step 65), the operation control unit 46 stops the operation of the pan/tilt mechanism 32 through the pan/tilt control unit 44 (Step S66). On the other hand, in a case in which the amount of movement of the camera body detected by the motion sensor 64 is less than the first threshold value (No in Step 65), the process returns to Step S60. The third threshold value is determined on the basis of whether an imaging environment is appropriate. For example, the third threshold value is set considering that the imaging environment is not an environment in which the amount of movement of the pan/tilt camera 10 is too large to capture a moving image.

As described above, in a case in which the amount of movement is equal to or greater than the third threshold value, the capture of moving images by the imaging unit 20 is stopped and the operation mode changes to the power saving mode. Therefore, in a case in which it is difficult to capture a useful moving image in the moving image capture operation, it is possible to reduce power consumption.

Figure 11:
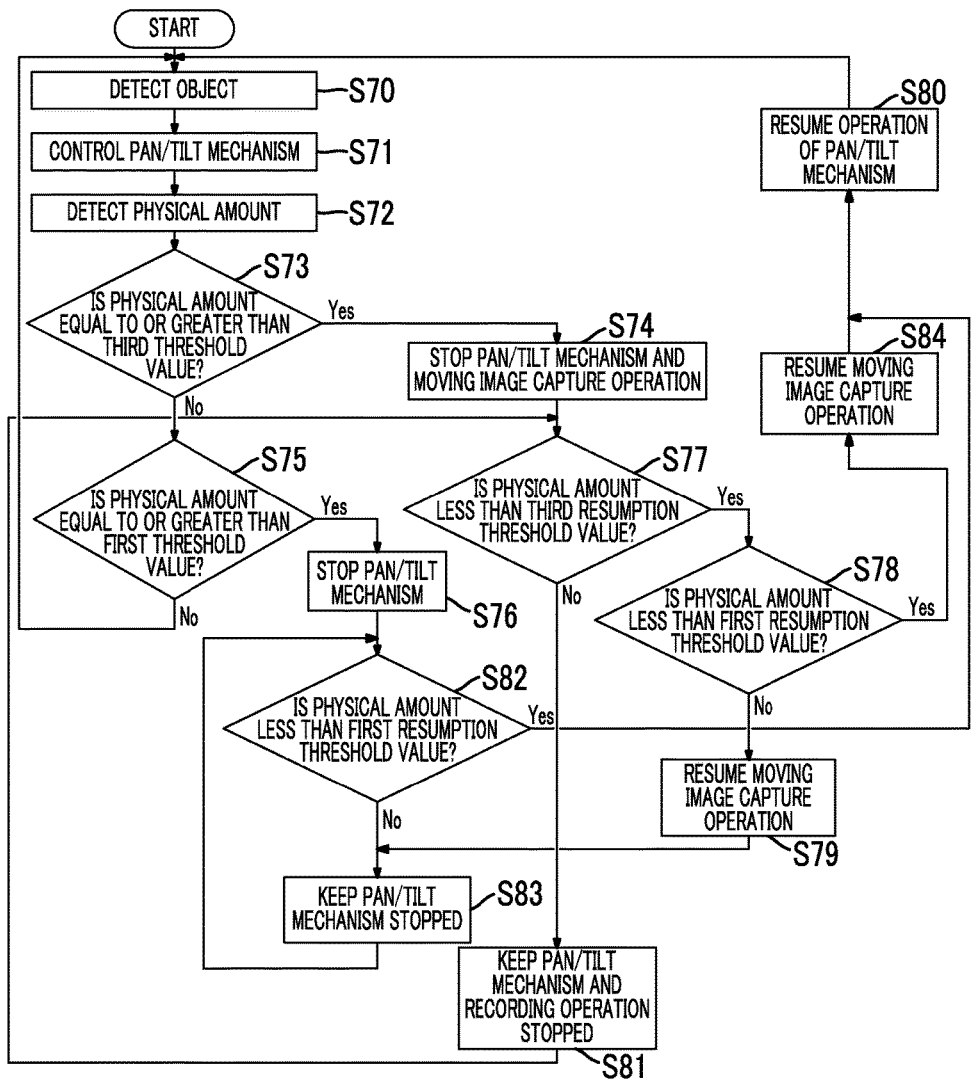
FIG. 11 is a flowchart illustrating the operation of the pan/tilt camera according to the third embodiment.

FIG. 11 is a flowchart illustrating the operation of the pan/tilt camera 10 in a case in which the operation of the pan/tilt mechanism 32 and the moving image capture operation of the imaging unit 20 are resumed after the pan/tilt mechanism 32 of the pan/tilt camera 10 is stopped and the moving image capture operation of the imaging unit 20 is stopped (power saving mode) (which has been described in FIG. 10).

Steps S60 to S66 in FIG. 10 correspond to Steps S70 to S76 in FIG. 11, respectively. That is, first, the object detection unit 65 detects the object to be tracked (Step S70). Then, the pan/tilt control unit 44 controls the pan/tilt mechanism 32 such that the object is tracked (Step S71). The motion sensor 64 detects the amount of movement of the pan/tilt camera 10 (Step S72). Then, in a case in which the amount of movement is equal to or greater than the third threshold value (Yes in Step S73), the operation control unit 46 stops the operation of the pan/tilt mechanism 32 and the moving image capture operation of the imaging unit 20 (Step S74).

On the other hand, in a case in which the amount of movement is less than the third threshold value (No in Step S73), the operation control unit 46 determines whether the amount of movement is equal to or greater than the first threshold value (Step S75). Then, in a case in which the amount of movement of the camera body detected by the motion sensor 64 is equal to or greater than the first resumption threshold value (Yes in Step S75), the operation control unit 46 stops the operation of the pan/tilt mechanism 32 through the pan/tilt control unit 44 (Step S76). On the other hand, in a case in which the amount of movement of the camera body detected by the motion sensor 64 is less than the first resumption threshold value (No in Step 75), the process returns to Step S70.

Even if the pan/tilt mechanism 32 is maintained in the stopped state, the motion sensor 64 continues to detect the amount of movement of the pan/tilt camera 10. Then, in a case in which it is determined that the amount of movement detected by the motion sensor 64 is less than the third resumption threshold value (Yes in Step S77), the operation control unit 46 determines whether the amount of movement is less than the first threshold value (Step S78). Then, in a case in which the amount of movement is less than the first resumption threshold value (Yes in Step S78), the operation control unit 46 resumes the moving image capture operation of the imaging unit 20 (cancels the power saving mode) (Step S84) and operates the pan/tilt mechanism 32 to resume the tracking of the object (Step S80). In a case in which the power saving mode is cancelled, a process of notifying the user that the power saving mode has been cancelled may be performed. For example, the operation control unit 46 outputs a signal such that a confirmation notice indicating that the power saving mode has been cancelled is displayed on the display input unit 120 of the smart phone 100. Here, the power saving mode means a standby state of the pan/tilt camera 10 and means a state in which power consumption is minimized.

On the other hand, in a case in which the amount of movement is less than the first resumption threshold value (No in Step S78), the operation control unit 46 resumes the moving image capture operation of the imaging unit 20 (cancels the power saving mode) (Step S79). In addition, in a case in which it is determined that the amount of movement detected by the motion sensor 64 is equal to or greater than the third resumption threshold value (No in Step S77), the operation control unit 46 keeps the operation of the pan/tilt mechanism 32 and the moving image capture operation of the imaging unit 20 stopped (Step S81). In a case in which the state in which the amount of movement detected by the motion sensor 64 is equal to or greater than the third threshold value is maintained for a predetermined period of time, the operation control unit 46 turns off the pan/tilt camera 10. Therefore, the state in which the pan/tilt camera 10 is turned on can be maintained for a short time even in a state in which a moving image is not captured. As a result, it is possible to effectively use power.

Even in a case in which the pan/tilt mechanism 32 is stopped, the motion sensor 64 continues to detect the amount of movement of the pan/tilt camera 10. In a case in which the amount of movement is less than the first resumption threshold value (Yes in Step S82), the operation control unit 46 operates the pan/tilt mechanism 32 to resume the tracking of the object (Step S80). On the other hand, in a case in which the amount of movement is equal to or greater than the first resumption threshold value (No in Step S82), the operation control unit 46 keeps the pan/tilt mechanism 32 stopped (Step S83). As such, in a case in which the amount of movement of the pan/tilt camera 10 is less than the third resumption threshold value, it is possible to resume the object tracking operation of the pan/tilt mechanism 32 and the moving image capture operation of the imaging unit 20. The third resumption threshold value is set to be less than the third threshold value and hysteresis is provided between the stop of the pan/tilt mechanism 32 and the resumption of the operation of the pan/tilt mechanism 32.

As described above, in a case in which the amount of movement of the pan/tilt camera 10 detected by the motion sensor 64 is equal to or greater than the third threshold value, the operation control unit 46 stops the moving image capture operation of the imaging unit 20 and changes the operation mode to the power saving mode. Therefore, in this embodiment, it is possible to prevent the capture of moving images under the environment that is not suitable for capturing moving images. In a case in which the amount of movement is less than the third resumption threshold value, the operation control unit 46 cancels the power saving mode and resumes the moving image capture operation of the imaging unit 20. The process in the above-mentioned operation flow can be interrupted or stopped in response to an operation of turning off the pan/tilt camera 10 or an operation input from the user.

<Fourth Embodiment>

Next, a fourth embodiment of the invention will be described. In this embodiment, in a case in which the operation of the pan/tilt mechanism 32 is resumed and object tracking is resumed, an object is detected from an image in a second region 201 larger than a first region 200 (see FIGS. 12A and 12B). That is, in a case in which the operation of the pan/tilt mechanism 32 and object tracking are resumed after the pan/tilt mechanism 32 is stopped and object tracking is stopped, the object detection unit 65 detects the object from the image in the second region 201 larger than the first region 200.

Figure 12A:
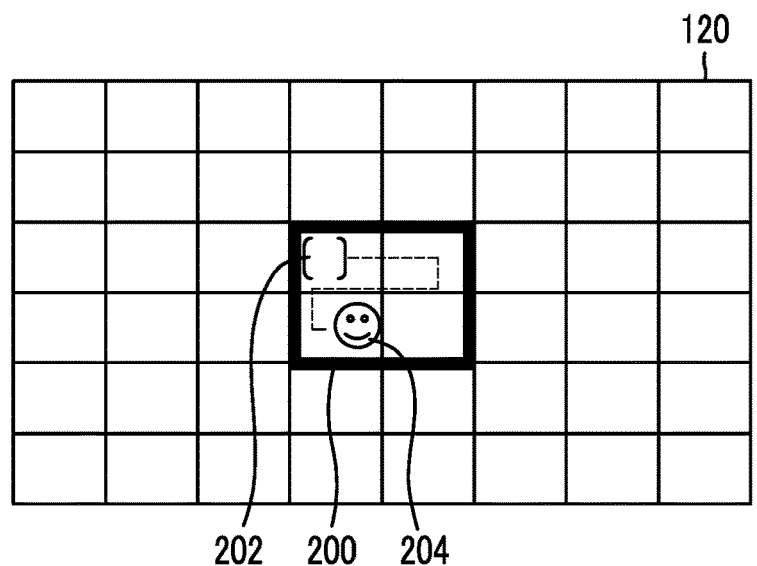
FIG. 12A is a conceptual diagram illustrating a region in which an object is detected.
Figure 12B:
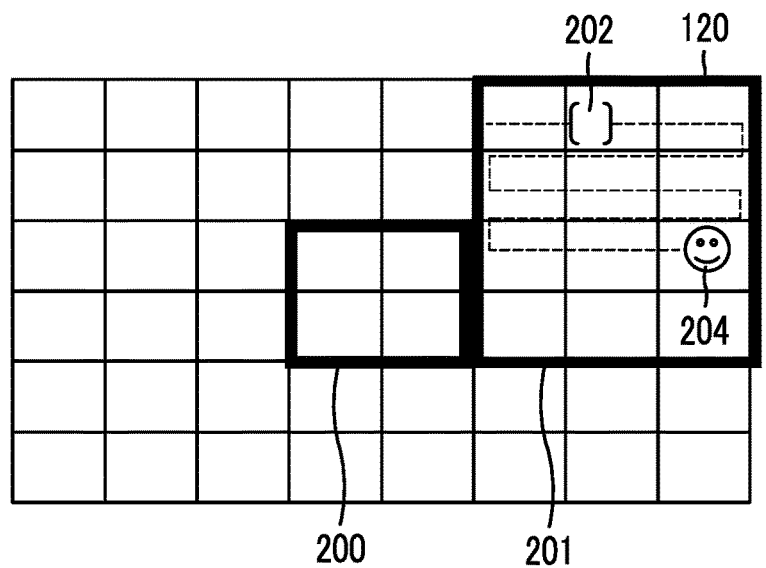
FIG. 12B is a conceptual diagram illustrating a region in which an object is detected.

FIGS. 12A and 12B are conceptual diagrams illustrating the region from which the object detection unit 65 detects an object. FIG. 12A illustrates a case in which the pan/tilt mechanism 32 is controlled so as to track an object 204 through the display input unit 120 (FIG. 3). A detection area 202 in the first region 200 of a moving image captured by the imaging unit 20 is scanned to detect the object 204. The first region 200 is determined by the object detection unit 65 on the basis of, for example, information related to the position where the object detection unit 65 finally detects the object and an instruction to operate the pan/tilt mechanism 32. That is, the object detection unit 65 determines the first region 200, considering, for example, the movement of the position of the object 204 in the angle of view by the operation of the pan/tilt mechanism 32 and the final position of the object 204 detected by the object detection unit 65 or the motion vector of the object 204. In FIGS. 12A and 12B, the first region 200 is provided at the center of the display input unit 120. However, the position is not limited thereto.

FIG. 12B is a diagram illustrating the detection of an object in a case in which the control of the pan/tilt mechanism 32 of the pan/tilt control unit 44 is resumed. In FIG. 12B, in a case in which the control of the pan/tilt mechanism 32 of the pan/tilt control unit 44 is resumed, the object 204, which is a tracking target, is detected from an image in the second region 201 that is larger than the first region 200 among the regions in the moving image captured by the imaging unit 20. That is, in some cases, while the pan/tilt mechanism 32 is in the stopped state, the object 204 moves to a region larger than the first region 200. Therefore, in a case in which the operation of the pan/tilt mechanism 32 is resumed to track the object 204, the object detection unit 65 detects the object 204, which is a tracking target, from the second region larger than the first region 200. For example, the object detection unit 65 may acquire information related to the amount of movement detected by the motion sensor 64 from the operation control unit 46 and determine a region in which the detection area 202 is canned.

In the example illustrated in FIG. 12B, the object detection unit 65 analyzes that the object 204 is present on the right region of FIG. 12B, on the basis of the information related to the amount of movement detected by the motion sensor 64 while the pan/tilt mechanism 32 is stopped, determines the right region of FIG. 12B as the second region, and scans the detection area 202. As another example, even in a case in which the pan/tilt mechanism 32 is stopped, the object detection unit 65 may continue to detect the object. In a case in which the pan/tilt mechanism 32 is operated to track the object, the object detection unit 65 may detect the object, using information related to the object detection which has been continuously performed.

As described above, in this embodiment, in a case in which the pan/tilt mechanism 32 is operated to resume the tracking of the object 204, the region in which the object is detected is expanded and object detection is performed. Therefore, the possibility that the desired object 204 will be detected increases.

The embodiments of the invention have been described above. However, the invention is not limited to the above-described embodiments and various modifications and changes of the invention can be made without departing from the scope and spirit of the invention.

EXPLANATION OF REFERENCES

10: imaging device (pan/tilt camera)
12: device body
14: base
16: holding portion
16A: gear
18: dome cover
19: imaging start button
20: imaging unit
22: imaging lens
23: diaphragm
24: imaging element
26: lens driving unit
28: CMOS driver
30: pan/tilt device
32: pan/tilt mechanism
34: pan driving unit
36: tilt driving unit
40: control unit
41: signal processing unit
42: imaging control unit
43: lens control unit
44: pan/tilt control unit
46: operation control unit
50: wireless communication unit
60: operating unit
61: camera-side display unit
62: memory
64: motion sensor
65: object detection unit
100: smart phone
101: main control unit
102: housing
110: wireless communication unit
120: display input unit
121: display panel
122: operation panel
130: calling unit
131: speaker
132: microphone
140: operating unit
141: camera unit
150: storage unit
151: internal storage unit
152: external storage unit
160: external input/output unit
170: GPS receiving unit
180: motion sensor unit
190: power supply unit
200: first region
201: second region
202: detection area
204: object

What is claimed is:

1. An imaging device comprising:
an imaging unit that includes an imaging lens and an imaging element;
a pan/tilt mechanism that rotates the imaging unit in a horizontal direction and a vertical direction with respect to a camera body;
an object detection unit that detects an object, which is a tracking target, from a moving image captured by the imaging unit;
a pan/tilt control unit that controls the pan/tilt mechanism such that the object detected by the object detection unit is tracked;
a motion sensor that detects a physical amount of the movement of the camera body by external force; and
an operation control unit that stops the pan/tilt mechanism in a case in which the physical amount detected by the motion sensor is equal to or greater than a first threshold value,
wherein, even if the pan/tilt mechanism is stopped, the imaging unit continues to track the object in the captured image.

2. The imaging device according to claim 1,
wherein the operation control unit directs the pan/tilt control unit to resume the control of the pan/tilt mechanism in a case in which the physical amount detected by the motion sensor is less than a first resumption threshold value that is less than the first threshold value.

3. The imaging device according to claim 1,
wherein the first threshold value includes a first horizontal direction threshold value which is related to the movement of the camera body in the horizontal direction and a first vertical direction threshold value which is related to the movement of the camera body in the vertical direction and is different from the first horizontal direction threshold value,
the physical amount detected by the motion sensor includes physical amounts related to the movement of the camera body in the horizontal direction and the vertical direction, and the operation control unit stops the operation of the pan/tilt mechanism in a case in which the physical amount in the horizontal direction which is detected by the motion sensor is equal to or greater than the first horizontal direction threshold value or in a case in which the physical amount in the vertical direction which is detected by the motion sensor is equal to or greater than the first vertical direction threshold value.

4. The imaging device according to claim 1, further comprising:
a recording unit in which the moving image captured by the imaging unit is recorded,
wherein the operation control unit stops a recording operation for the recording unit in a case in which the physical amount detected by the motion sensor is equal to or greater than a second threshold value that is greater than the first threshold value.

5. The imaging device according to claim 4,
wherein the operation control unit resumes the recording operation for the recording unit in a case in which the physical amount detected by the motion sensor is less than a second resumption threshold value that is less than the second threshold value.

6. The imaging device according to claim 1,
wherein the operation control unit changes an operation mode to a power saving mode in which the capture of the moving image by the imaging unit is stopped in a case in which the physical amount detected by the motion sensor is equal to or greater than a third threshold value that is greater than the first threshold value.

7. The imaging device according to claim 6,
wherein the operation control unit cancels the power saving mode and resumes the capture of the moving image by the imaging unit in a case in which the physical amount detected by the motion sensor is less than a third resumption threshold value that is less than the third threshold value.

8. The imaging device according to claim 4,
wherein the operation control unit turns off the imaging device in a case in which a state in which the physical amount detected by the motion sensor is equal to or greater than the second threshold value is maintained for a predetermined period of time.

9. The imaging device according to claim 6,
wherein the operation control unit turns off the imaging device in a case in which a state in which the physical amount detected by the motion sensor is equal to or greater than the third threshold value is maintained for a predetermined period of time.

10. The imaging device according to claim 2,
wherein, in a case in which the pan/tilt mechanism is controlled so as to track the object, the object detection unit detects the object, which is the tracking target, from an image in a first region of the moving image captured by the imaging unit, and
in a case in which the control of the pan/tilt mechanism by the pan/tilt control unit is resumed, the object detection unit detects the object, which is the tracking target, from an image in a second region that is larger than the first region in the moving image captured by the imaging unit.

11. An imaging method of an imaging device comprising an imaging unit that includes an imaging lens and an imaging element and a pan/tilt mechanism that rotates the imaging unit in a horizontal direction and a vertical direction with respect to a camera body, the method comprising:
an object detection step of detecting an object, which is a tracking target, from a moving image captured by the imaging unit;
a pan/tilt control step of controlling the pan/tilt mechanism such that the object detected in the object detection step is tracked;
a movement detection step of detecting a physical amount of the movement of the camera body by external force; and
an operation control step of stopping the pan/tilt mechanism in a case in which the physical amount detected in the movement detection step is equal to or greater than a first threshold value,
wherein, even if the pan/tilt mechanism is stopped, the imaging unit continues to track the object in the captured image.

12. A non-transitory computer-readable tangible medium having a program that causes a computer to perform the imaging method according to claim 11.

13. An imaging device comprising:
an imaging unit that includes an imaging lens and an imaging element;
a pan/tilt mechanism that rotates the imaging unit in a horizontal direction and a vertical direction with respect to a camera body;
an object detection unit that detects an object, which is a tracking target, from a moving image captured by the imaging unit;
a pan/tilt control unit that controls the pan/tilt mechanism such that the object detected by the object detection unit is tracked;
a motion sensor that detects a physical amount of the movement of the camera body by external force; and
an operation control unit that stops the pan/tilt mechanism in a case in which the physical amount detected by the motion sensor is equal to or greater than a first threshold value,
wherein, even if the pan/tilt mechanism is in a stopped state, the motion sensor continues to detect the amount of movement of the camera body.

* * * * *